(12) United States Patent
Hirth et al.

(10) Patent No.: US 8,998,252 B2
(45) Date of Patent: *Apr. 7, 2015

(54) RESTRAINT SYSTEM

(75) Inventors: Andreas Hirth, Dielheim (DE); Lutz Quarg, Boeblingen (DE); Friedrich Reiter, Sindelfingen (DE); Clark Ruedebusch, Holzgerlingen (DE)

(73) Assignee: Daimler AG, Stuttgart (DE)

( * ) Notice: Subject to any disclaimer, the term of this patent is extended or adjusted under 35 U.S.C. 154(b) by 1741 days.

This patent is subject to a terminal disclaimer.

(21) Appl. No.: 12/377,573

(22) PCT Filed: Jun. 23, 2007

(86) PCT No.: PCT/EP2007/005558
§ 371 (c)(1),
(2), (4) Date: Dec. 6, 2011

(87) PCT Pub. No.: WO2008/019726
PCT Pub. Date: Feb. 21, 2008

(65) Prior Publication Data
US 2012/0068445 A1 Mar. 22, 2012

(30) Foreign Application Priority Data
Aug. 14, 2006 (DE) .......................... 10 2006 038 125

(51) Int. Cl.
B60R 21/231 (2011.01)
(52) U.S. Cl.
CPC ..... B60R 21/231 (2013.01); *B60R 2021/23115* (2013.01)
(58) Field of Classification Search
USPC ................. 280/729, 736, 738, 743.1
See application file for complete search history.

(56) References Cited

U.S. PATENT DOCUMENTS

| | | | | |
|---|---|---|---|---|
| 3,784,225 A | * | 1/1974 | Fleck et al. | 280/729 |
| 3,788,663 A | * | 1/1974 | Weman | 280/729 |
| 3,843,150 A | | 10/1974 | Harada et al. | |
| 3,883,154 A | * | 5/1975 | McCullough et al. | 280/735 |
| 3,887,213 A | * | 6/1975 | Goetz | 280/738 |

(Continued)

FOREIGN PATENT DOCUMENTS

| | | |
|---|---|---|
| DE | 2158341 | 5/1972 |
| DE | 2 302 737 | 8/1973 |

(Continued)

OTHER PUBLICATIONS

International Search Report dated Sep. 20, 2007 with a English translation (Nine (9) pages).

(Continued)

*Primary Examiner* — Paul N Dickson
*Assistant Examiner* — Barry Gooden, Jr.
(74) *Attorney, Agent, or Firm* — Crowell & Moring LLP

(57) ABSTRACT

A restraint system for a motor vehicle unfolds from a storage position to a restraint position. The unfolding is carried out by at least one supporting structure that can be inflated by a gas pressure source; and in the restraining position, the occupant is provided with a carrier volume for restraining the occupant in the displacement position, whereby the carrier volume is enclosed by at least one carrier structure. The dimension of the restraint system is adapted to the respective load condition, and the flexible carrier structure is fixed for enclosing the carrier volume by inflating the supporting structure.

11 Claims, 4 Drawing Sheets

(56) References Cited

U.S. PATENT DOCUMENTS

| | | | |
|---|---|---|---|
| 3,907,327 A | 9/1975 | Pech | |
| 3,929,350 A * | 12/1975 | Pech | 280/729 |
| 3,970,328 A | 7/1976 | Wallsten | |
| 4,076,277 A | 2/1978 | Kuwakado et al. | |
| 4,500,114 A * | 2/1985 | Grey, Jr. | 280/742 |
| 4,875,548 A | 10/1989 | Lorsbach | |
| 5,372,381 A * | 12/1994 | Herridge | 280/743.1 |
| 5,542,695 A | 8/1996 | Hanson | |
| 5,984,348 A | 11/1999 | Specht et al. | |
| 6,260,877 B1 * | 7/2001 | Rasmussen, Sr. | 280/729 |
| 6,702,320 B1 * | 3/2004 | Lang et al. | 280/729 |
| 6,726,245 B2 | 4/2004 | Fellhauer et al. | |
| 6,913,283 B2 | 7/2005 | Heym | |
| 7,188,862 B2 * | 3/2007 | Webber | 280/729 |
| 7,360,790 B2 | 4/2008 | Hasebe et al. | |
| 7,396,043 B2 * | 7/2008 | Choi et al. | 280/743.1 |
| 7,448,644 B2 * | 11/2008 | Zhong et al. | 280/729 |
| 7,503,583 B2 * | 3/2009 | Muller | 280/743.1 |

FOREIGN PATENT DOCUMENTS

| | | |
|---|---|---|
| DE | 2 406 500 | 8/1974 |
| DE | 195 40 911 A1 | 5/1997 |
| DE | 197 25 122 A1 | 12/1998 |
| DE | 201 02 115 U1 | 8/2001 |
| DE | 101 19 351 C1 | 7/2002 |
| DE | 102 24 138 A1 | 12/2003 |
| EP | 0 200 998 A2 | 11/1986 |
| EP | 0 589 059 B1 | 3/1994 |
| EP | 1 364 838 A2 | 11/2003 |
| EP | 1 477 372 A1 | 11/2004 |
| GB | 1 420 226 | 1/1976 |
| JP | 3-49048 A | 3/1991 |
| JP | 2001-114065 A | 4/2001 |
| JP | 2005-14864 A | 1/2005 |
| SU | 1470584 A1 | 4/1989 |
| WO | WO 99/65737 A2 | 12/1999 |

OTHER PUBLICATIONS

German Search Report dated Nov. 10, 2006.

Form PCT/ISA/237 dated Jun. 23, 2007 with an English translation of the pertinent portions (Nine (9) pages).

English translation of Chinese Office Action (four (4) pages), Dated Aug. 5, 2010.

* cited by examiner

RESTRAINT SYSTEM

CROSS REFERENCE TO RELATED APPLICATIONS

This application is related to U.S. patent application Ser. No. 12/377,529 (now U.S. Pat. No. 8,317,223), filed on the same date.

This application is a continuation of PCT International Application No. PCT/EP/2007/005558, filed Jun. 23, 2007, which claims priority under 35 U.S.C. §119 to German Patent Application No. 10 2006 038 125.4, filed Aug. 14, 2006, the entire disclosure of which is herein expressly incorporated by reference.

BACKGROUND AND SUMMARY OF THE INVENTION

The present invention relates to a restraint system for a motor vehicle.

Inflatable restraint systems such as driver or passenger air bags are well-known in series-production of vehicles. In a storage position the air bag is folded, and when an accident is detected, it is filled with gas in a pyrotechnical manner, so that it abruptly unfolds towards an occupant who is being displaced in a forward direction. For this purpose, it is important that the air bag quickly reaches its effective volume, and it is therefore necessary to produce relative large amounts of gas (e.g., in a pyrotechnical manner) and to introduce them into the gas bag. Recently, for dimensioning the gas volume to be added, occupant/and or vehicle parameters have been evaluated, so as not to unfold the gas bag to its full size for example with a so-called "out of position" of the occupant. However, the necessity for adjustment to all possible load conditions and the relatively cost-intensive control and regulation technique have made this feature problematic.

Intensified efforts have been made, therefore, to develop so-called self-regulating systems which can adjust automatically to the corresponding load conditions.

German patent document DE 2 302 737 discloses a restraint system comprising a two-layer gas bag, where the gas is guided only between the two layers, so that a complete gas cushion does not result; rather, a spherical annular support structure. The unfolding of the support structure thereby occurs in the transverse direction of the abutting gas cushions. On the other hand, European patent document EP 0589 059 B1 shows furthermore, that it is necessary during the unfolding of the two-layer gas bag to suck ambient air into the interior to overcome the negative pressure.

Both of these systems have in common the feature that less gas volume is necessary to unfold the gas bag to its full size, due to the gas bag's formed in a double layer. The temperature and the pollution can thereby be reduced.

Finally, UK patent document GB 1 420 226 A discloses a restraint system for a motor vehicle where a tubular supporting structure is provided in the interior of the two-layer gas cushion, the longitudinal extension of which exceeds the dimensions of the transverse extension in the inflated (that is, active) state. The supporting structure unfolds due to its particular geometry mainly in the direction of its longitudinal extension.

An automatic adjustment of the gas bag dependent on the respective load condition (e.g., dependent on the respective occupant or his or her position) is thereby not described.

It is therefore an object of the present invention to improve the generic restraint system in such a manner that its size is adjusted to the respective load condition.

This and other objects and advantages are achieved by the restraint system according to the invention, in which one or more supporting structures can be unfolded by filling them with gas from a gas pressure source, while restraint is ensured by a carrier volume enclosed by flexible carrier structures. When the restraint system is activated, only the supporting structures are filled with gas (for example in a pyrotechnical manner). During the unfolding or erection of the supporting structures, flexible carrier structures are fixed, which enclose a carrier volume that is formed by aspiration of ambient air due to the fast unfolding of the system, and is sufficient to restrain the occupant.

As used herein, the term "supporting structure" refers to a structure similar to a skeleton or a supporting frame-like structure, which achieves a restraint effect in the fully unfolded state which is comparable to that of a conventional gas bag, but which has a considerably more complex structure, for example a branched tree structure. Thereby, not only the necessary gas volume can be reduced, but also the force peaks acting on the occupant during unfolding, if he or she is effectively "in the way" of the unfolding supporting structure. In contrast, the gas amount in the conventional gas bag is on a substantially higher level from the start of the activation until the full unfolding, so that obstacles the unfolding path are put under more pressure independent of the unfolding state.

Furthermore, as used herein, the term "flexible carrier structure" refers to a structure which connects the supporting structures amongst each other. The carrier structure may be, for example, an air bag fabric, a net or a similar flexible sheet.

One advantage of the present invention is that gas from a gas pressure source need only to be made available for filling the supporting structures. The gas amount and the load on the occupant can thereby be reduced considerably. Further, it has been shown that the supporting structures can also be stopped during the unfolding due to the low gas volume. That is, the unfolding of the affected structure can be stopped or hindered more easily by an "out of position" occupant, without straining him or her excessively, while other supporting structures can unfold further, so that the flexible carrier structures are fixed and thus the carrier volume can still be developed in such a manner that a restraining action takes place.

If the longitudinal extension of the supporting structure in the active state considerably exceeds the dimensions of its transverse direction, a supporting structure is provided, which is in an essentially tubular form. The reduced cross section of the tubular form can reduce the force on the occupant at a constant pressure, due to the physical law pressure=force/area. The supporting structure can thus be stopped by low forces during unfolding, which can for example take place by bending. Due to the particular geometric form of the supporting structure (that is, due to its longitudinal extension which extends its cross section), the stability and/or the final volume or the final extension which it would have with a complete unfolding is not achieved when it impacts upon an obstacle. The supporting structure has a different stability during the unfolding due to its longitudinal formation. While the supporting structure is initially rather unstable (that is, it can easily be impeded during unfolding), the completely unfolded supporting structure still achieves full stability. This means that, if the supporting structure impacts upon an obstacle during the unfolding, (as is the case for example with an occupant who is leaning forward, "out of position"), the unfolding can be stopped or deflected due to the supporting structure which is still unstable. These small forces effect a lower pressurization of the occupant.

A supporting structure can preferably be formed as a pilot tube, which is initially filled with the gas from the gas pressure source after the activation. This means that this pilot tube can be used to open the air bag flap in a specific manner. The pilot tube does not necessarily have to be tubular. It can also have the form of e.g., a tetrahedron.

The pilot tube is preferably in overlap with a set break line/location below the air bag cover. When the pilot tube is filled, its cross section abruptly increases in a region that is limited, but which is very effective towards the opening, so that the air bag flap can be pressed open with less gas and the restraint system can escape. Thus less energy is necessary for opening the flap. The load can be lowered.

In a further embodiment of the invention, venting and/or inflow apertures can be provided in the restraint system, which enable the inflow of ambient air or the venting depending on the load condition.

If the venting and/or inflow apertures comprise a variable cross section which can be adjusted dependent on the unfolding degree of the supporting structure, the restraint system can be formed in a self-regulating manner. That is, the cross section of the venting and/or the inflow apertures adjusts itself over the extension of the restraint system, depending on the load condition. The opening cross section can for example be opened or closed by means of a slider, the more the supporting structure unfolds for example. The connection between the slider and the supporting structures can for example take place via linkages or rebound straps.

With conventional compact gas bags, it was previously necessary to refrain from directing venting apertures towards the occupant, because gas temperatures are reached which are too high. However, with the system according to the invention, cold ambient air flows within the carrier volume, and not pyrotechnically produced gas, and venting apertures can be directed towards the occupant due to the reduced temperature. The air bag dampening can thus be adapted for various environmental conditions, by sealing a venting aperture cross section by the occupant with a different contact surface between occupant and air bag.

Thus, this contact surface and its sealing with persons having a higher volume (and usually a higher weight) is larger, so that a stronger restraint action is achieved hereby. With more severe accidents, the contact surface and thus the restraint action is also increased by a stronger immersion of the occupant into the air bag. This principle also permits a variable air bag dampening for belted and unbelted occupants, because the occupant in the unbelted state will be immersed into the air bag with less force.

If the venting apertures are formed as perforations (that is, many small apertures), as for example with a textile net, a projection area corresponding to the measurements of the occupant can be closed. The reproducibility of the results increases on average with many small venting apertures.

In order to produce the gas necessary for the supporting structures, a gas pressure source, in particular a gas generator, with only small dimensions is necessary, so that the restraint system can be stored in the roof region in a storage position. The air bags usually stored in the steering wheel or in the cockpit region could then be omitted in favor of restraint systems, which can be stored in the roof frame region in a space-saving manner and which unfold obliquely from above towards the direction of the occupant. It would be advantageous that, with this arrangement, driver and passenger air bags do not have to differ. Restraint systems which are identical in construction could be provided for the driver and for the passenger or even occupants of the rear passenger compartment.

It is also possible to reactivate the carrier volume again after a first activation, in that the supporting structure is for example designed/sealed in such a manner that it keeps its interior pressure for a longer time (more than 100 ms), so that it can erect at least partially during load relief. Thus a carrier volume results from the renewed aspiration of ambient air. This is advantageous for the occupants for a possible follow-up impact.

In a preferred embodiment, at least one of the supporting structures extends at least partially in overlap with a hard structure, as for example a supporting column. It is also possible to provide a structure which unfolds between the occupants as an interaction bag.

To manufacture a complex supporting structure with its inflatable components and the flexible sheets, the one-piece woven technique is recommended. This technique distinguishes itself in that, on one and the same structure, a double layer can be manufactured for the inflatable structures, and one layer for the flexible sheets, or a three-dimensional structure can be woven.

If a supporting structure impacts upon an obstacle during unfolding, the gas flowing into the supporting structure can be distributed to other adjacent supporting structures or into the environment with the aid of redistribution elements. It is also possible to reduce the inner pressure in the supporting structure generated by the flow, by increasing the cross section. This can be done in such a manner that tear seams break down at a certain pressure, so that the supporting structure can increase in its transverse direction. A pressure-relief valve, which opens when an interior pressure is reached which is too high, can also be used.

If several supporting structures are connected to one another by the flexible carrier structures, in particular sheets, the gas can be used for restraining action in the carrier volume enclosed by the carrier structure. The gas in the carrier volume, which serves to restrain occupants, can be heated or supplemented by means of a heating device (e.g., an ignition tablet or a small gas generator step, which develops heat and possibly a low gas volume). The gas volume or the inner pressure and thus the restraint action increases therewith correspondingly.

Other objects, advantages and novel features of the present invention will become apparent from the following detailed description of the invention when considered in conjunction with the accompanying drawings.

DETAILED DESCRIPTION OF THE DRAWINGS

Figure 1:
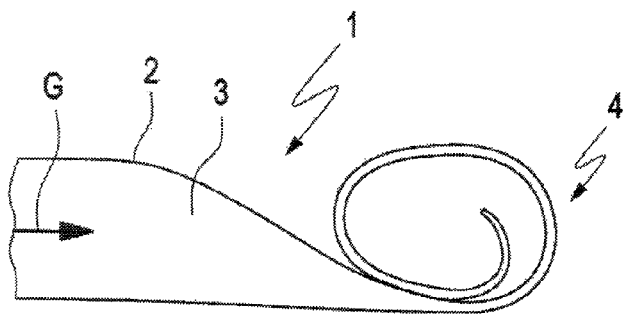
FIG. 1 shows a supporting structure shortly after activation of a gas generator.
Figure 2A:
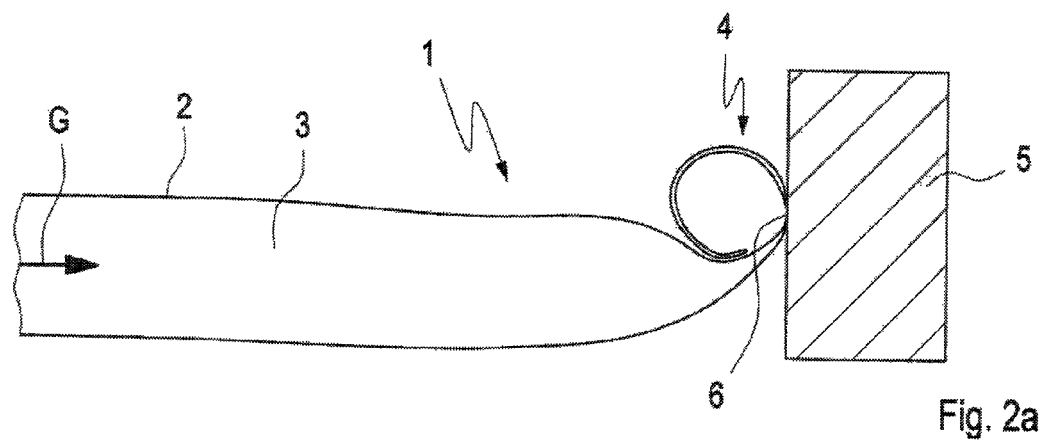
FIG. 2*a* shows the obstruction of the unfolding of the supporting structure according to FIG. 1 when it impacts upon an obstacle.
Figure 2B:
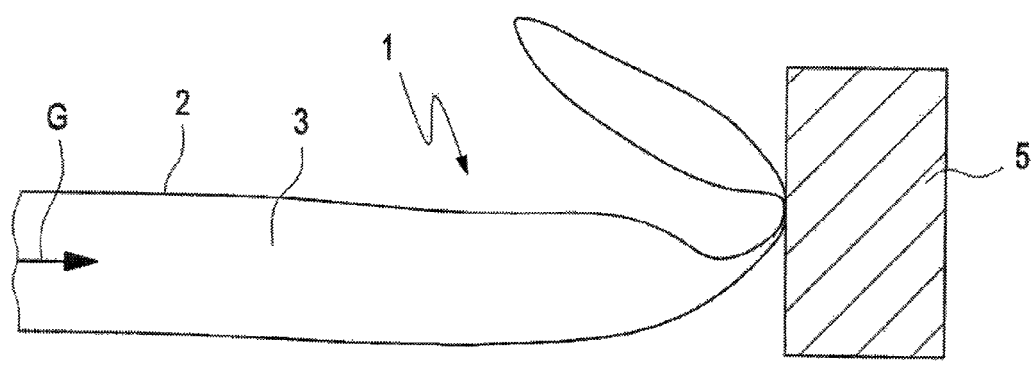
FIG. 2*b* shows an evasion of the supporting structure according to FIG. 1 when impacting upon an obstacle 1.
Figure 3:
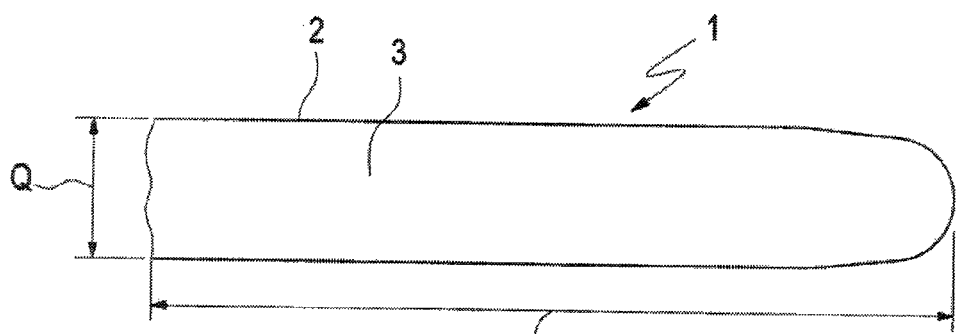
FIG. 3 shows the supporting structure according to FIG. 1 in the fully unfolded state.

FIGS. 1 to 3 show a supporting structure 1 in a schematic side view, which is rolled up in the deactivated state. Alternatively, a zigzag folding or other foldings are possible. As can be seen especially from FIG. 3, the length L of the supporting structure in the fully extended active or deployed state substantially exceeds the dimensions of the cross section Q. It is thereby unimportant which form of cross section the supporting structure 1 comprises. If a gas generator assigned to the supporting structure 1 is activated by inflation, the abruptly generated gas G reaches the interior 3 of the supporting structure 1 formed by walls 2.

If an obstacle 5 is present in the unfolding path, the portion 4 that is not yet unfolded due to the low cross section is disconnected, so that no further G can flow in (see FIG. 2*a*). The supporting structure 1 is markedly unstable in relation to interfering transverse forces in this state, so that the portion not yet unfolded is simply disconnected at the location 6 when an obstacle is impacted. The supporting structure thereby does not achieve the stability which it would have when fully unfolded and/or the end volume or the final extension, and the load values on the occupants are thus reduced substantially.

Depending on the impact angle between the obstacle 5 and the supporting structure 1, an evasion of the supporting structure can take place instead of the complete disconnection (see FIG. 2*b*). The supporting structure also does not achieve the stability which it would have when fully unfolded.

If the supporting structure 1 is however completely filled with gas (FIG. 3), full stability is achieved.

FIGS. 1 to 3 show the principal mode of operation of an individual supporting structure. The restraint system develops its full restraint effect only in cooperation with flexible carrier structures. This is explained in the following by means of FIGS. 4 to 7.

Figure 4:
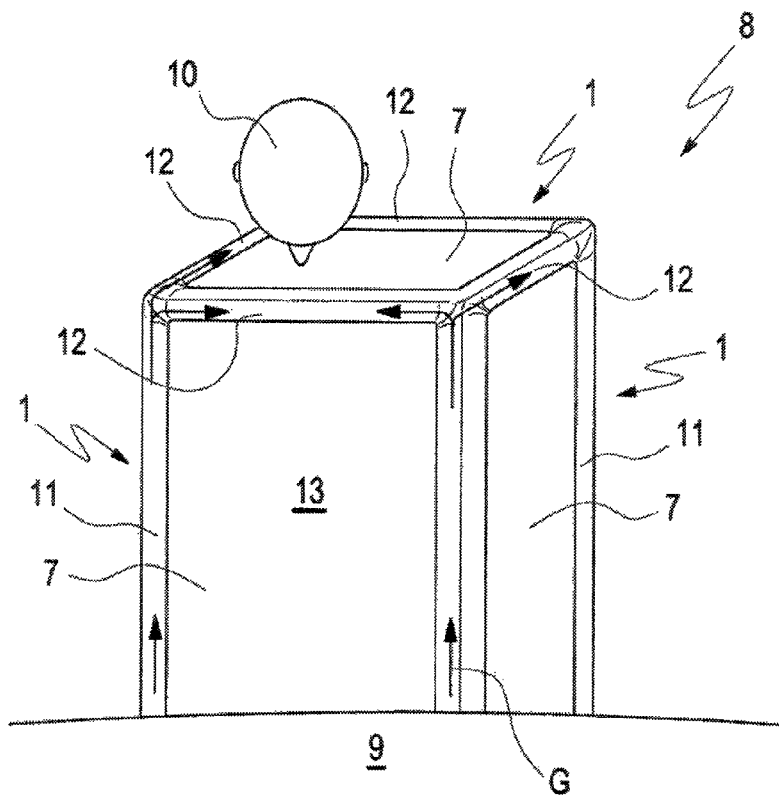
FIG. 4 shows a restraint system with a complex supporting structure.
Figure 5:
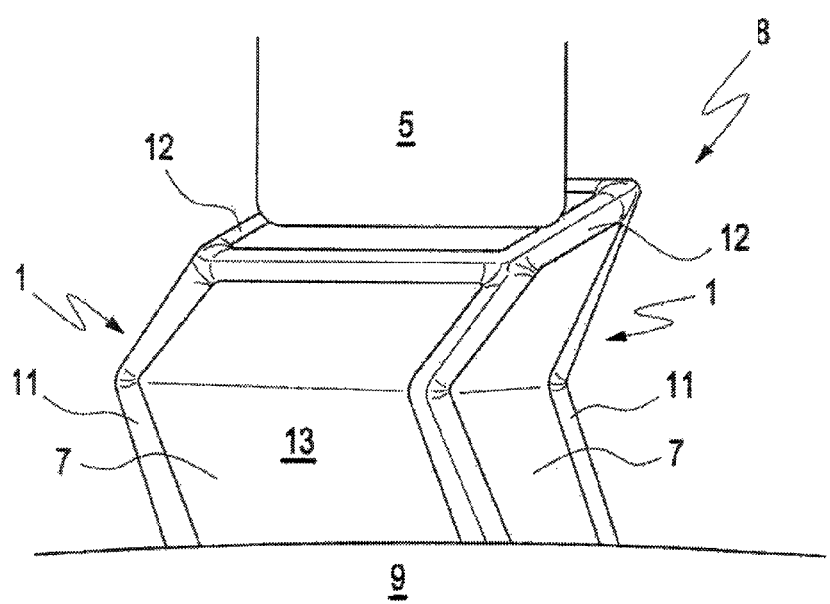
FIG. 5 shows the restraint system according to FIG. 4 when impacting upon an obstacle.

FIG. 4 shows a restraint system 8 in its restraint (deployed) position. It includes several supporting structures 1, with several flexible carrier structures 7 connecting them. The restraint system 8 has unfolded from its storage position in the cockpit 9 towards an occupant 10. Supporting structures 11 are provided, which are fluidically connected to one another via transverse supporting structures 12. Flexible carrier structures 7 (in particular flexible sheets) are fixed between the supporting structures 11 and 12. The flexible carrier structures 7 enclose thereby a carrier volume 13 (which is cuboidal in this case). It is obvious that the outer form of the carrier volume 13 is dependent on the spatial course of the supporting structures and the carrier structures.

Figure 8:
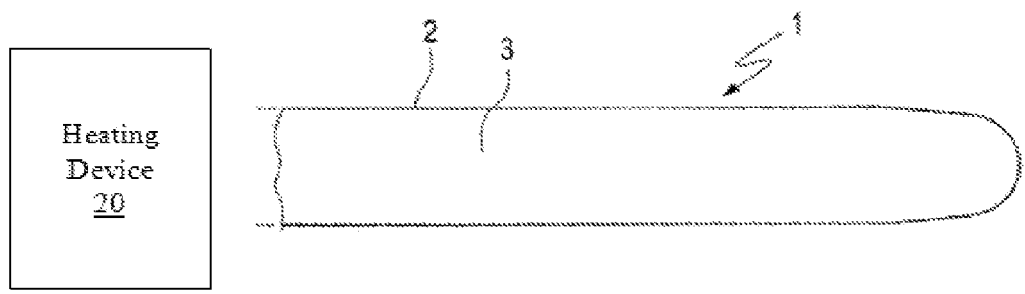
FIG. 8 is another illustration of the supporting structure according to FIG. 1 in the fully unfolded condition.

During unfolding of the restraint system 8, the supporting structures 11 are first filled with gas, so that they are erected and that the gas can also flow into the transverse supporting structures 12 according to the arrow direction G. The flexible carrier structures 7 are thereby fixed between the supporting structures 11, 12 and the carrier volume 13 is enclosed. The ambient air necessary for the restraining action is aspired into the interior of the restraint system 8 by corresponding inflow apertures. The negative pressure resulting in the interior of the restraint system 8 effects a fast aspiration of ambient air, so that an additional pressure source is not necessary. If the interior pressure should still be too low, the gas can be heated or supplemented by means of a heating device (e.g., an ignition tablet or a small gas generator step, which generates heat and possibly a low gas volume), so that the gas expands abruptly and the inner pressure thus increases. This can be achieved using the heating device 20 illustrated in FIG. 8.

If the unfolding restraint system 8 impacts upon an obstacle 5, for example an "out of position" occupant, the unfolding of the supporting structures 11 is obstructed by pinching off or bending. Nevertheless, a carrier volume 13 is enclosed by at least partial fixing of the carrier structures 7, which brings about a corresponding restraint action.

Figure 6:
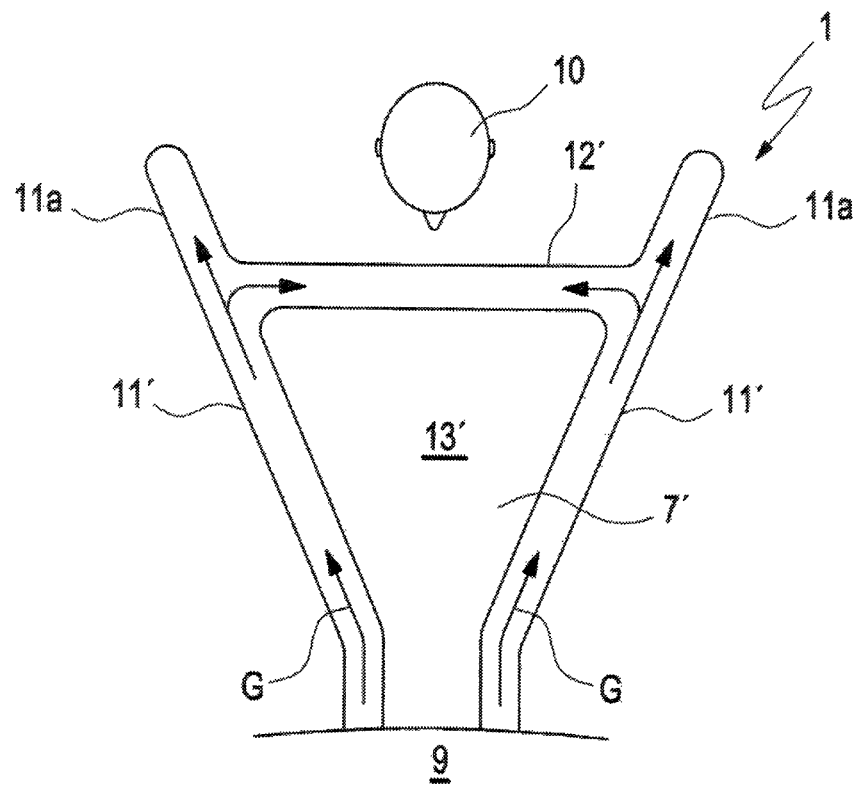
FIG. 6 shows a restraint system in a further embodiment with a complex supporting structure that includes two supporting structures connected to one another by a flexible sheet.

A second embodiment is shown in FIG. 6. The same reference numerals indicate the same components. Differing embodiments are characterized by an apostrophe.

The supporting structures 11' are filled with gas from a gas pressure source according to the arrow direction G. The gas flows from the supporting structures 11' into the transverse supporting structures 12'. The flexible carrier structures 7' are fixed again by the erection of the supporting structures 11', 12', so that the carrier volume 13' results. The supporting structures 11' projecting beyond the transverse supporting structures 12' have a particular importance. Lateral supports can be formed through these projecting portions 11*a*, which can absorb transverse forces for example during an offset frontal collision.

Figure 7:
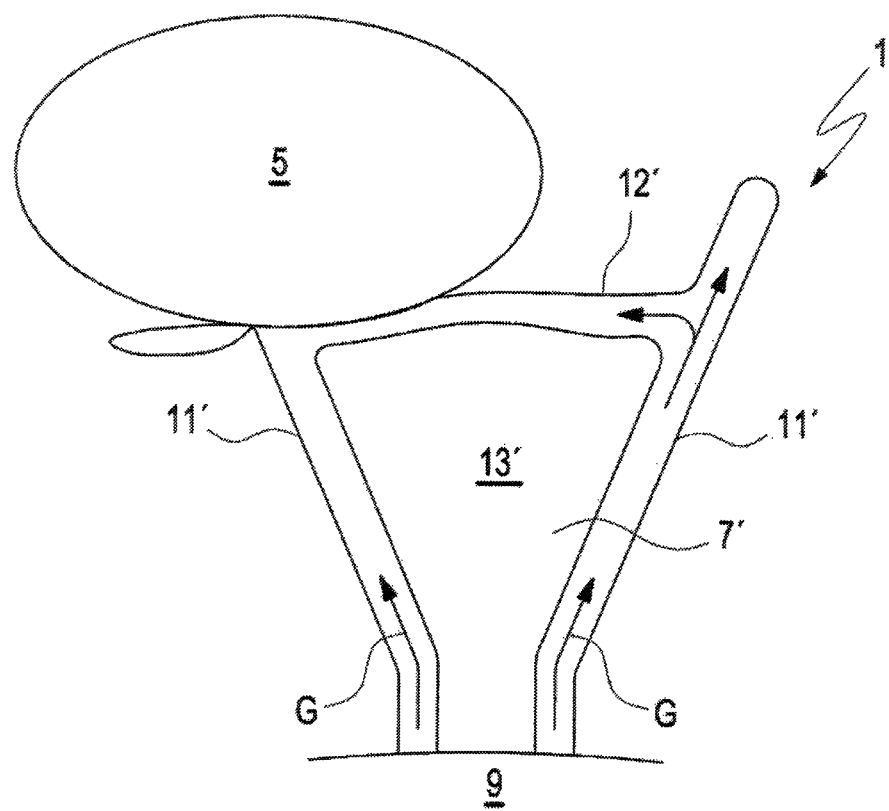
FIG. 7 shows the restraint system according to FIG. 6 when impacting upon an obstacle.

FIG. 7 shows the behavior of the restraint system 8' during impact upon an obstacle. The left supporting structure 11' is disconnected in such a manner that it cannot erect any further. The disconnection takes place as described in FIG. 2*b*.

With the embodiments according to FIGS. 6 and 7, the carrier volume can also be increased by means of the heating element, that is, the interior pressure can be designed in an incremental manner.

It should also be pointed out that the embodiments of the restraint systems are only schematic. It is obvious that very complex supporting structures can be produced with the teachings according to the invention, as for example branched tree structures or structures similar to supporting frames. Branches within the carrier volume are also feasible.

The arrangement of the supporting structures in cooperation with the flexible carrier structures, in particular sheets, depends significantly on the position of the restraint system within the vehicle and the load conditions to be expected. Thus, the supporting frame arrangement for a lateral impact protection will be designed in a different manner due to spatial reasons than supporting structures for the frontal impact. It is however a fact that a plurality of positions can be achieved in the vehicle with the longitudinal supporting structures, which cannot be achieved with conventional gas bags due to the necessary gas volume.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A restraint system for a motor vehicle that unfolds from a storage position into a restraining position, wherein the restraint system comprises:
   first, second, and third supporting structures, each of which has a longitudinal extension in a deployed state that substantially exceeds a transverse extension, and each of which unfolds mainly in a direction of the longitudinal extension; and
   a flexible carrier structure connected between the first, second and third supporting structures and enclosing a carrier volume, wherein the first, second, and third supporting structures have substantially a same shape in the deployed state, wherein the first and second supporting structures each have an inlet coupled to receive gas from an external source, and the third supporting structure is configured to receive gas from the external source via connections with the first and second supporting structures, wherein in the deployed state the first and second supporting structures extend in a longitudinal direction of the motor vehicle and the third supporting structure extends in a transverse direction of the motor vehicle between the first and second supporting structures, and wherein the third supporting structure is configured along a length of the first and second supporting structures such that in the deployed state projecting portions with free terminal ends of the first and second supporting structures extend beyond the connections with the third supporting structure to form an open space receiving an occupant of the motor vehicle.

2. The restraint system according to claim 1, wherein the storage position is in a roof region of the vehicle.

3. The restraint system according to claim 1, wherein the carrier volume can be activated again after a first activation.

4. The restraint system according to claim 1, wherein one of first, second, and third supporting structures extends with an at least partial overlap of a structure of the motor vehicle.

5. The restraint system according to claim 1, wherein at least one of said first, second, and third supporting structures unfolds between vehicle occupants as an interaction bag.

6. The restraint system according to claim 1, wherein the first, second, and third supporting structures and the flexible carrier structure are produced in a one-piece-woven structure.

7. The restraint system according to claim 1, further comprising a heating device which heats or supplements aspired or enclosed gas in an activated state of the first, second, and third supporting structures.

8. The restraint system according to claim 1, wherein venting or inflow apertures are provided.

9. The restraint system according to claim 8, wherein the venting or inflow apertures comprise a variable cross section which can be adjusted dependent on a degree of unfolding of the first, second, and third supporting structures.

10. The restraint system according to claim 8, wherein the venting or inflow apertures are directed towards an occupant, and are situated such that they are covered by the occupant who is displaced in a forward direction.

11. The restraint system according to claim 8, wherein the venting or inflow apertures are perforations or other passages, which are included in the flexible carrier structure enclosing the carrier volume.

* * * * *